(12) United States Patent
Korpman

(10) Patent No.: US 11,991,591 B2
(45) Date of Patent: *May 21, 2024

(54) MONITORING APPARATUS AND SYSTEM

(71) Applicant: Dillon James Korpman, Nashville, TN (US)

(72) Inventor: Dillon James Korpman, Nashville, TN (US)

(\*) Notice: Subject to any disclaimer, the term of this patent is extended or adjusted under 35 U.S.C. 154(b) by 0 days.

This patent is subject to a terminal disclaimer.

(21) Appl. No.: 16/780,959

(22) Filed: Feb. 4, 2020

(65) Prior Publication Data

US 2020/0351617 A1    Nov. 5, 2020

Related U.S. Application Data

(63) Continuation of application No. 15/947,696, filed on Apr. 6, 2018, now Pat. No. 10,555,125.

(60) Provisional application No. 62/482,218, filed on Apr. 6, 2017, provisional application No. 62/610,554, filed on Dec. 27, 2017.

(51) Int. Cl.
| | |
|---|---|
| *H04W 4/90* | (2018.01) |
| *H04M 1/72421* | (2021.01) |
| *H04M 1/72424* | (2021.01) |
| *H04M 3/51* | (2006.01) |
| *H04W 4/029* | (2018.01) |
| *H04M 1/72451* | (2021.01) |
| *H04M 1/72457* | (2021.01) |
| *H04W 4/021* | (2018.01) |

(52) U.S. Cl.
CPC ....... *H04W 4/029* (2018.02); *H04M 1/72421* (2021.01); *H04M 1/72424* (2021.01); *H04M 3/5116* (2013.01); *H04M 3/5183* (2013.01); *H04W 4/90* (2018.02); *H04M 1/72451* (2021.01); *H04M 1/72457* (2021.01); *H04M 2201/14* (2013.01); *H04M 2242/04* (2013.01); *H04M 2242/10* (2013.01); *H04M 2242/14* (2013.01); *H04M 2242/28* (2013.01); *H04M 2250/10* (2013.01); *H04M 2250/12* (2013.01); *H04W 4/021* (2013.01)

(58) Field of Classification Search
CPC ..................................................... G08B 27/00
See application file for complete search history.

(56) References Cited

U.S. PATENT DOCUMENTS

| | | | |
|---|---|---|---|
| 8,364,197 B2 * | 1/2013 | Binning | H04L 12/2829 |
| | | | 379/52 |
| 8,417,641 B1 * | 4/2013 | Wiltgen | H04L 63/10 |
| | | | 705/59 |

(Continued)

*Primary Examiner* — Michael T Vu
(74) *Attorney, Agent, or Firm* — Wayne Edward Ramage; Baker Donelson

(57) ABSTRACT

A monitoring apparatus that provides multi-level monitoring of personal activities by a user. The monitoring apparatus includes a display, a user interface, a GPS location device, a timer or clock, and wireless or cellular communication transmitters or similar devices. The user designates one or more contacts who will be notified if certain pre-established monitoring conditions are met (e.g., if the user may be in trouble). When the pre-established monitoring conditions are met, the contacts are alerted and notified via phone, email, text, or similar means of communication, or combinations thereof, of the user's location, contact information, and the state that caused the alert and notification.

16 Claims, 22 Drawing Sheets

(56) References Cited

U.S. PATENT DOCUMENTS

| | | | |
|---|---|---|---|
| 9,942,332 B2* | 4/2018 | Chan | H04L 67/18 |
| 10,810,695 B2* | 10/2020 | Knopp | H04W 4/029 |
| 2013/0150028 A1* | 6/2013 | Akins | B62H 5/20 |
| | | | 455/456.3 |
| 2014/0327540 A1* | 11/2014 | Shin | G08B 21/0446 |
| | | | 340/539.11 |
| 2016/0142894 A1* | 5/2016 | Papakonstantinou | H04W 4/90 |
| | | | 455/404.1 |
| 2018/0033288 A1* | 2/2018 | Strack | G08B 25/016 |

* cited by examiner

MONITORING APPARATUS AND SYSTEM

This application is a continuation of U.S. patent application Ser. No. 15/947,696, filed Apr. 4, 2018, which claims benefit of and priority to U.S. Provisional Applications No. 62/610,554, filed Dec. 27, 2017, and No. 62/482,218, filed Apr. 6, 2017, by Dillon James Korpman, and is entitled to the benefit of those filing dates. The complete specifications, drawings, and disclosures of U.S. Provisional Applications Nos. 62/610,554 and 62/482,218 and U.S. patent application Ser. No. 15/947,696 are incorporated herein in their entireties by specific reference for all purposes.

FIELD OF INVENTION

This invention relates to an apparatus and system for active, multi-level monitoring of personal activities by a user.

SUMMARY OF INVENTION

In various exemplary embodiments, the present invention comprises a monitoring apparatus that provides multi-level monitoring of personal activities by a user. The monitoring apparatus comprises a display, a user interface (which can be coupled with the display, such as by means of a touch-screen display), a GPS location device, a timer or clock, and wireless or cellular communication transmitters or similar devices. Access to the device requires satisfying one or more layers of security, such as a password, PIN, biometric identification, or similar security means or combinations thereof. The user designates one or more contacts who will be notified if certain pre-established monitoring conditions are met (i.e., if the user may be in trouble). In one embodiment, three contacts are provided. When the pre-established monitoring conditions are met, the contacts are alerted and notified via phone, email, text, or similar means of communication, or combinations thereof, of the user's location, contact information, and the state that caused the alert and notification.

In several embodiments, the device monitors three parameters: the speed of the user, duration (which can be a set amount of time, or a particular target time), and location. The user starts a monitoring event by entering expected values for one or more of the monitored parameters. For example, if the event being monitoring is walking from a short distance from home to a school, the user selects walking for the speed, 10 minutes as the expected duration, and the school as the destination location. The user then initiates the event, and the monitoring device begins monitoring the event. If certain of the monitored parameters exceed certain values (e.g., the speed of the user is greater than typical walking speed, e.g., 30 or 40 mph, which indicates that the user is now riding in a car; the duration of the event has exceeded the expected duration by 5 minutes, 10 minutes, or some other established limit; the location of the device is not at the target destination or within a reasonable distance of the expected pathway from the first location to the destination), then the apparatus displays an alert. The user then has a limited amount of time to deactivate the alert by entering a password or code. Failure to enter the password or code causes the device to send an alert or notification to the registered contacts. In several embodiments, the user can enter an alternative password or code to cause the apparatus alert to appear to be deactivated, but immediately causes an alert to be sent to the listed contacts, and, in some cases, an automatic call to the police or 911 emergency service.

In additional embodiments, the device includes an "SOS" or emergency alert button. Pressing the SOS or emergency alert button causes an alert to be sent immediately to the listed contacts. In some cases, an automatic call to the police or 911 emergency service may also be sent. In several embodiments, certain types of situations can result in alerts being dispatched to all listed contacts and/or the police or 911 emergency service. User privacy is otherwise maintained outside the alerts.

The system also provides for scheduling and carrying out one or more "safety calls." The user submits a request to the remote service to perform a call to the user's mobile phone at a particular time or within a particular window (multiple calls can be scheduled). The system then makes a call at the scheduled time to the user's device with a reasonable, area-code specific callback number displayed on the screen. If the call is not answered, an alert is sent immediately to the listed contacts. In some cases, an automatic call to the police or 911 emergency service may also be sent. If the call is answered but the user is under duress, the user may provide a seemingly normal or innocuous response but with a particular code word or phrase (or without a particular code word or phrase), which in turn triggers an alert as described above.

BRIEF DESCRIPTION OF THE DRAWINGS

FIG. 5 shows a view of an active monitoring event screen.

DETAILED DESCRIPTION OF EXEMPLARY EMBODIMENTS

In various exemplary embodiments, the present invention comprises a monitoring apparatus that provides multi-level monitoring of personal activities by a user. The monitoring apparatus comprises a display, a user interface (which can be coupled with the display, such as by means of a touch-screen display), a GPS location device, a timer or clock, and wireless or cellular communication transmitters or similar devices.

In several embodiments, access to the device requires satisfying one or more layers of security, such as a password, PIN, biometric identification, or similar security means or combinations thereof (FIGS. 12-15 shows screens for a user to set up a security PIN code). The user designates one or more contacts who will be notified if certain pre-established monitoring conditions are met (i.e., if the user may be in trouble). In one embodiment, three contacts are provided. When the pre-established monitoring conditions are met, the contacts are alerted and notified via phone, email, text, or similar means of communication, or combinations thereof, of the user's location, contact information, and the state that caused the alert and notification.

Figure 1:
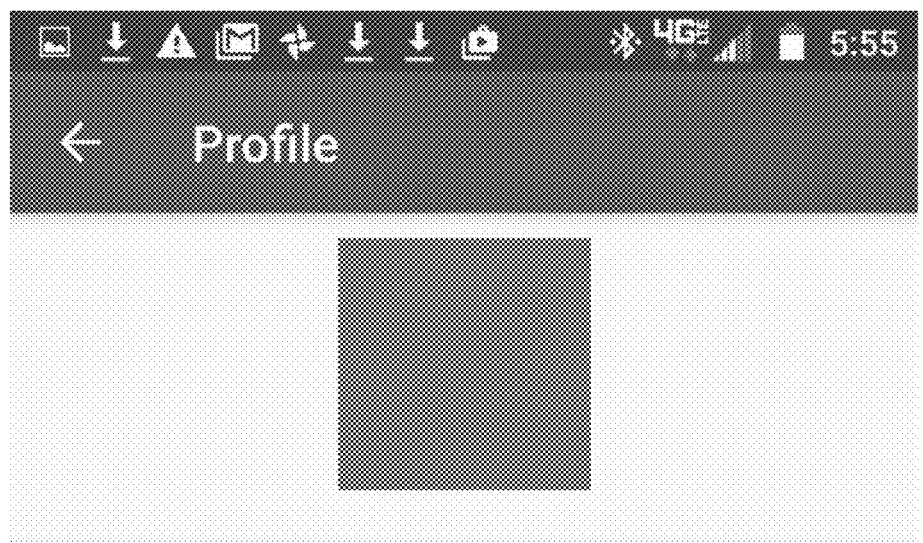
FIGS. 1-2 show views of a profile interface screen for a monitoring system on an apparatus in accordance with an embodiment of the present invention.

FIG. 1 shows an example of a profile screen through which the user can enter one or more emergency contacts 20. The user enters a name or referent for the contact, and a phone or contact number 24 (typically a cellphone number that can be called or texted).

Figure 2:
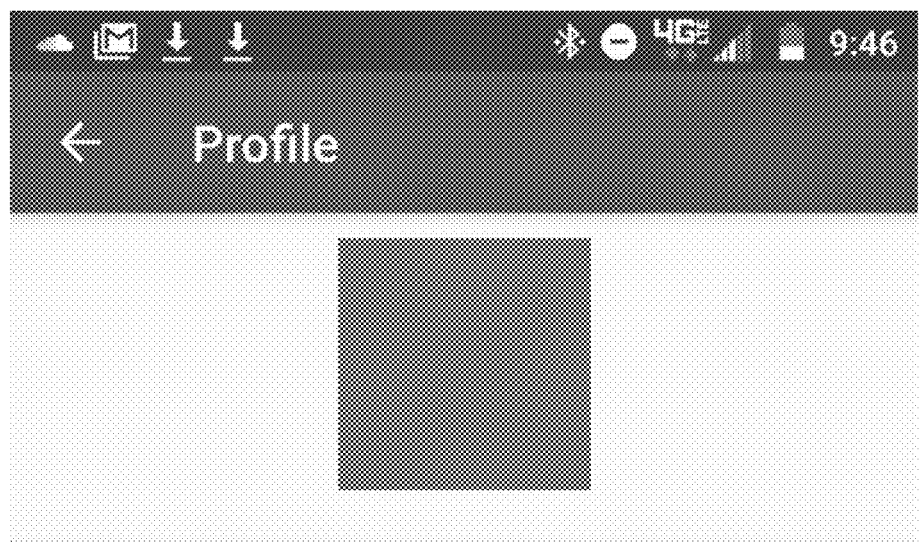
Figure 3:
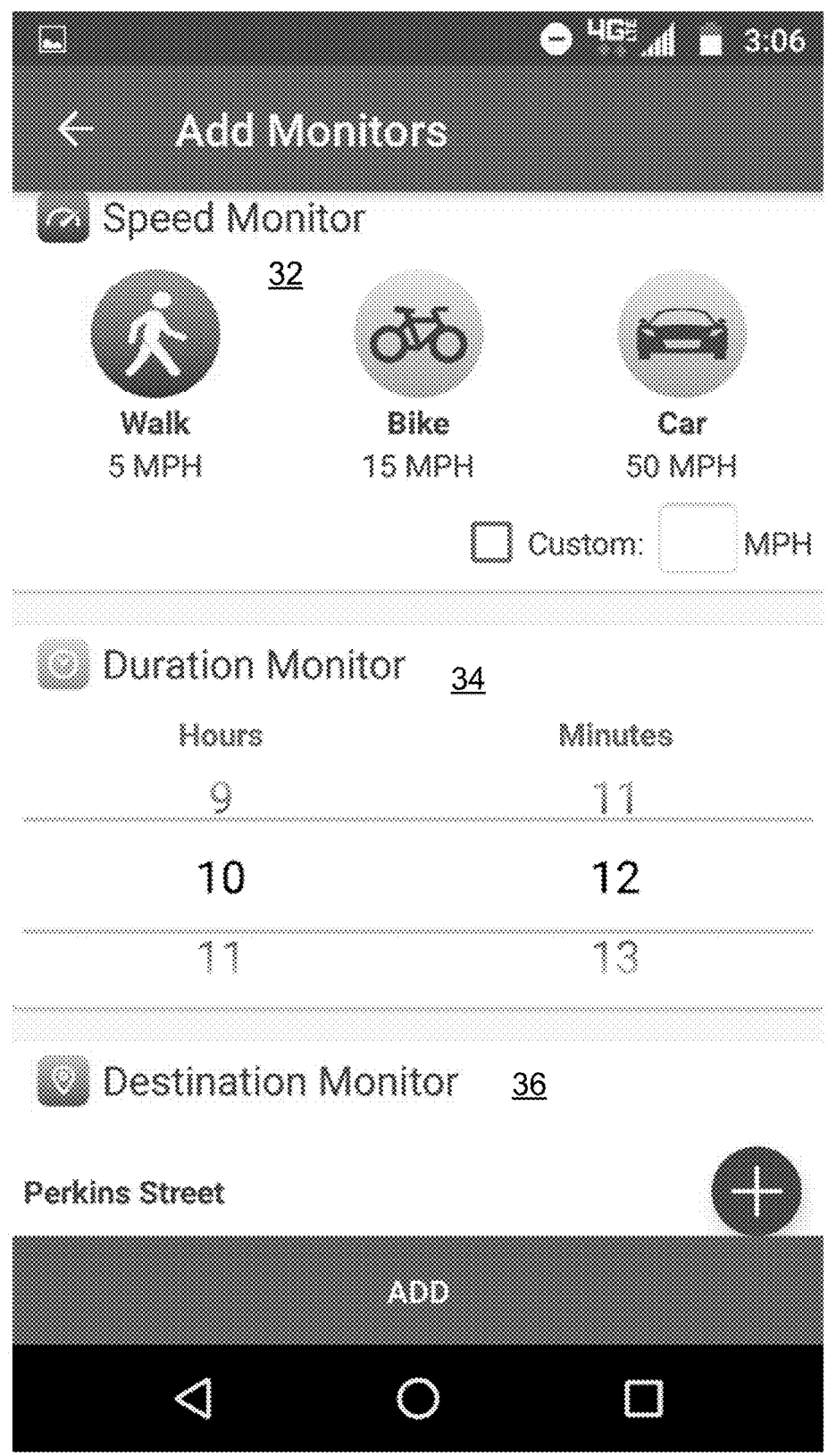
FIG. 3 shows a view of an add monitor event interface screen.

FIG. 2 shows an example of an add monitor screen through which the user can select and specify one or more parameters for monitoring. In several exemplary embodiments, the device monitors three parameters: the speed of the user 32, duration 34 (which can be a set amount of time, or a particular target time), and location or destination 36. The user enters expected values for one or more of the monitored parameters. For example, if the event being monitoring is walking from a short distance from home to a school, the user would select "walking" for the speed, 10 minutes as the expected duration, and the school as the destination location.

As seen in FIG. 2, can select a default speed option (e.g., walk, bike, car), which would have an associated default velocity or speed (e.g., 5 mph for walking). Alternatively, the user can click the "custom" box and enter a specific, custom speed for the system to use. Similarly, the user can selection a duration (e.g., hours and minutes). Location or destination can be set by entry of an address or pre-set location, or by choosing a selection from a menu or map.

Figure 4:
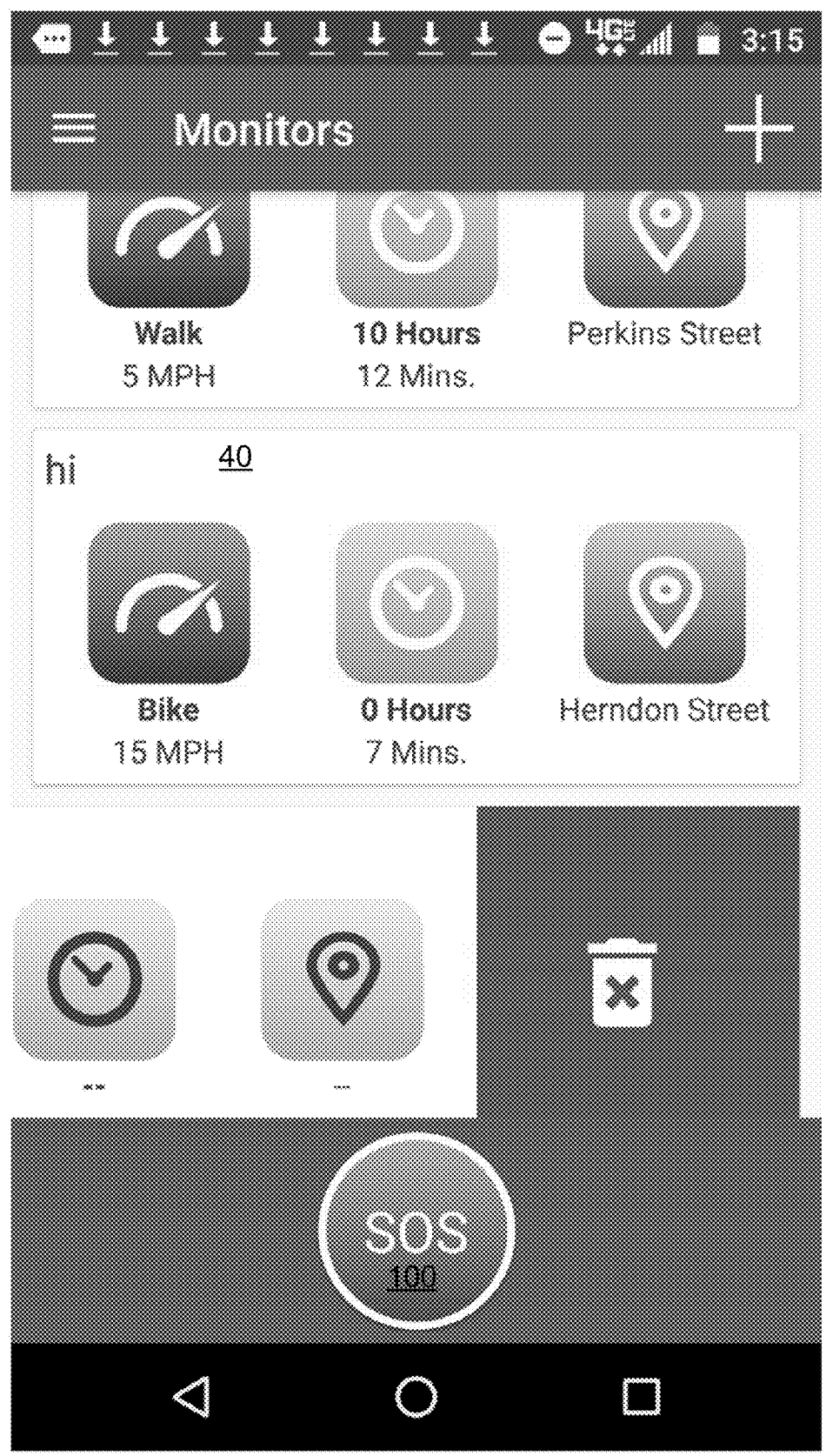
FIGS. 4-5 show views of a monitor event list.
Figure 5:
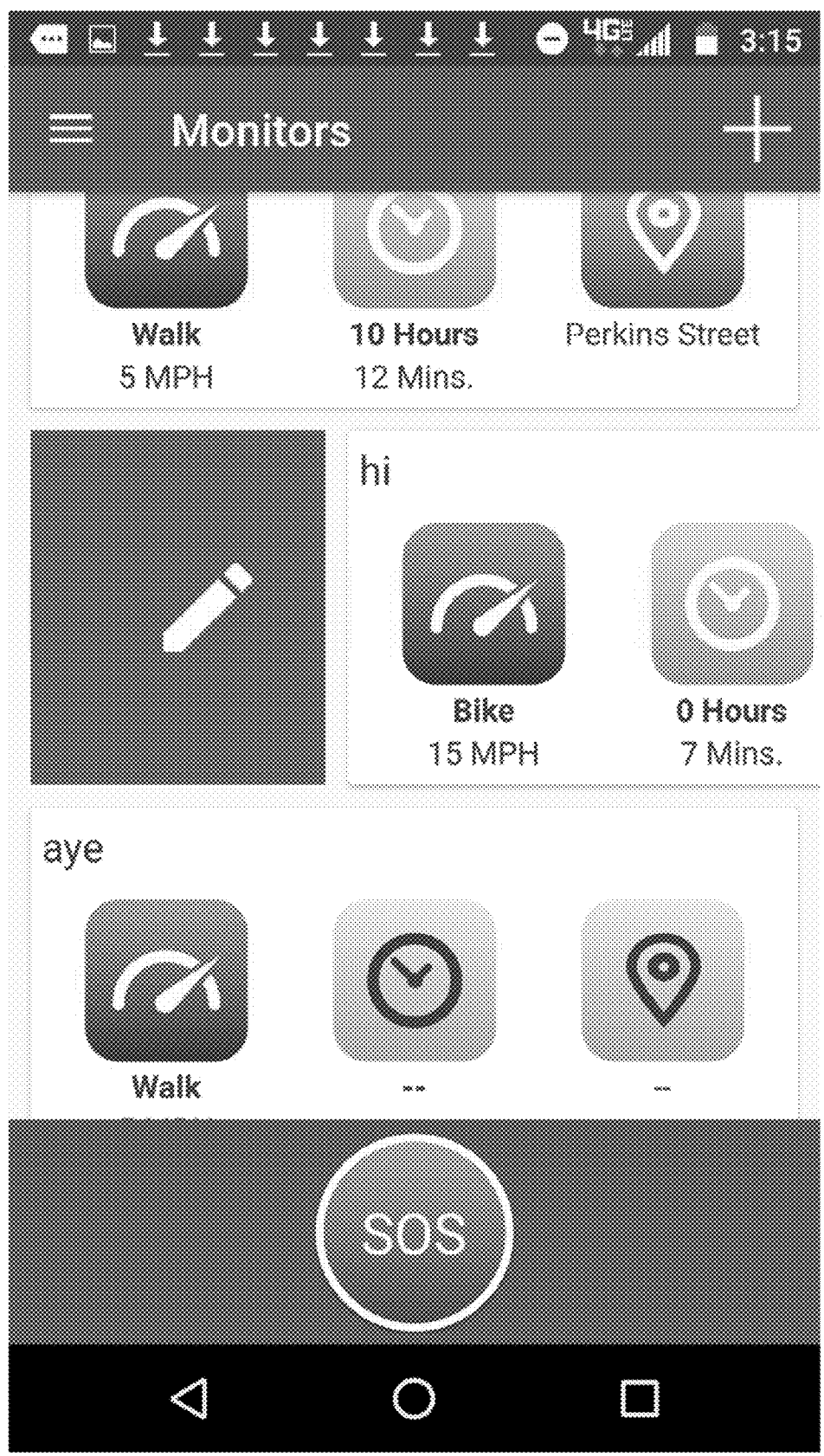
Figure 6:
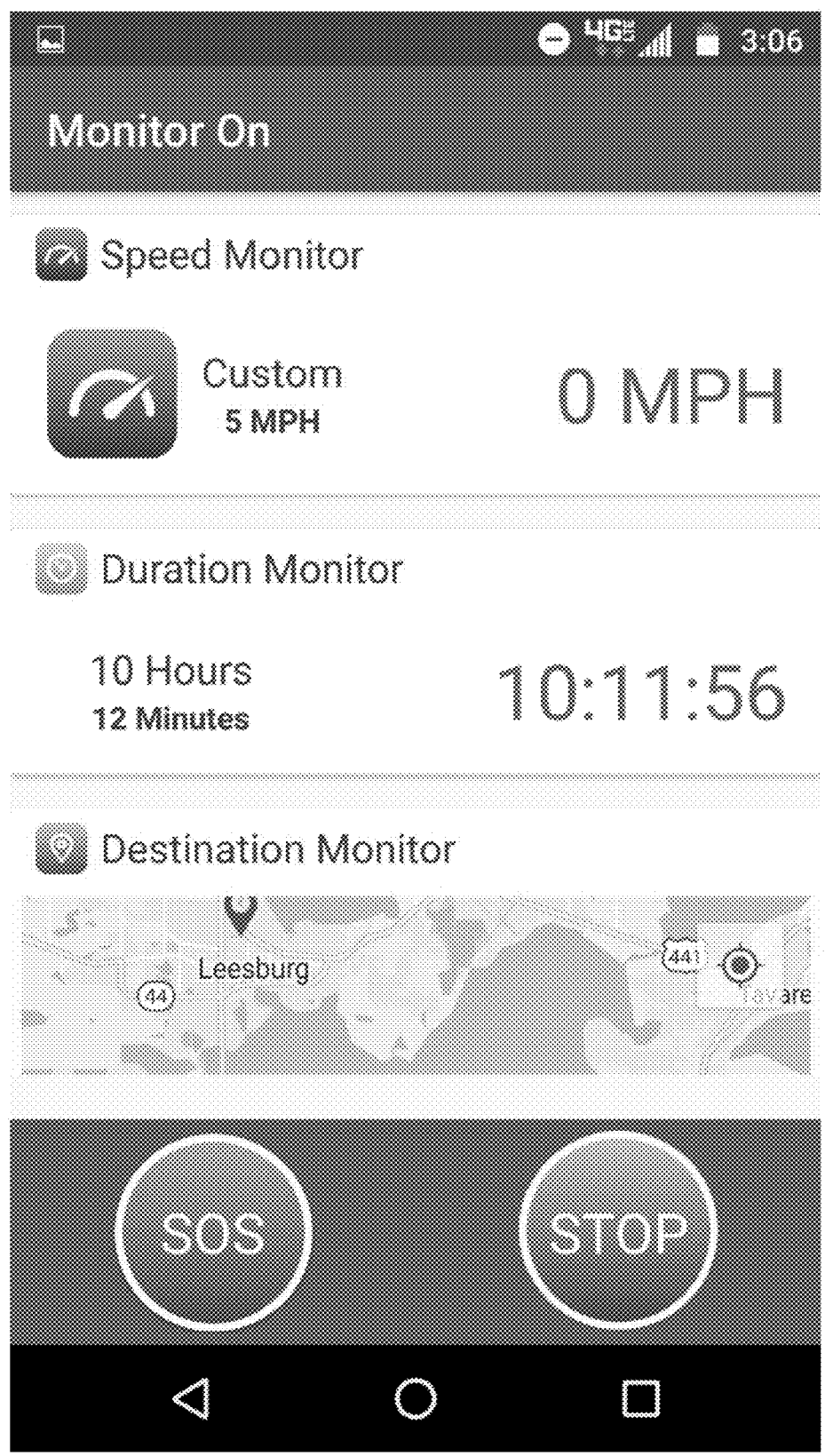
Figure 16:
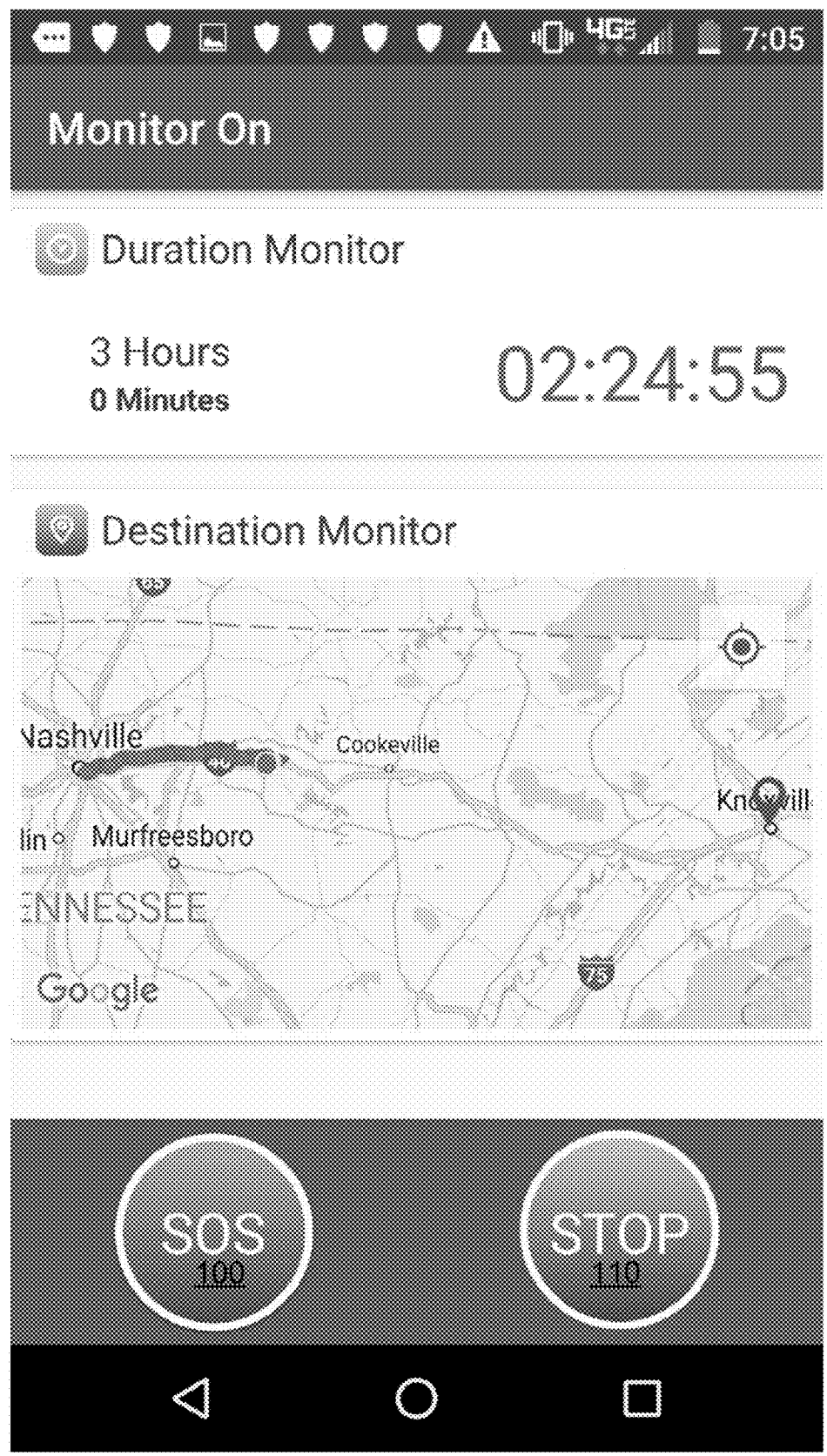
FIG. 16 shows another view of an active monitoring event screen.

A particular combination of parameters can be established and saved as named or designated monitoring events 40, as seen in FIGS. 4-5 (the monitor events screen). The user selects and initiates the event, and the monitoring device begins monitoring the event. FIGS. 6 and 16 show examples of the "monitor on" screen after a particular monitoring event has been started. In the embodiments shown, the user's device shows speed, duration (with a timer), and current location and destination location. In some embodiments, as seen in FIG. 16, a map showing the origination location, current location, destination location, and travel progress/route may be displayed.

The user also can select specific contacts from the list of emergency contacts as monitors for the specific monitoring event. All emergency contacts, or a subset of emergency contacts, can be designated as default monitors.

Figure 7:
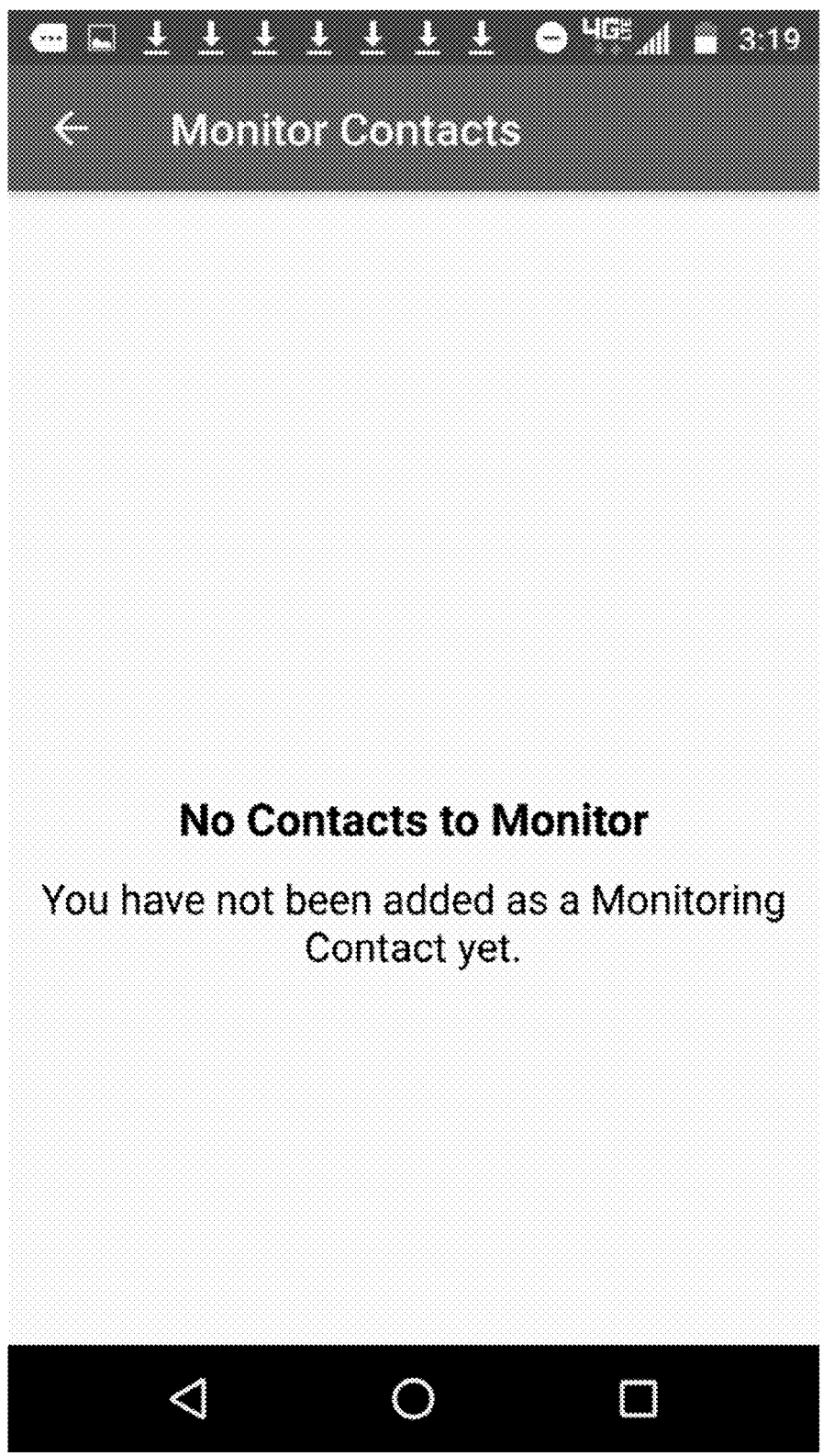
FIG. 7 shows an example of a no-contacts-to-monitor screen.
Figure 18:
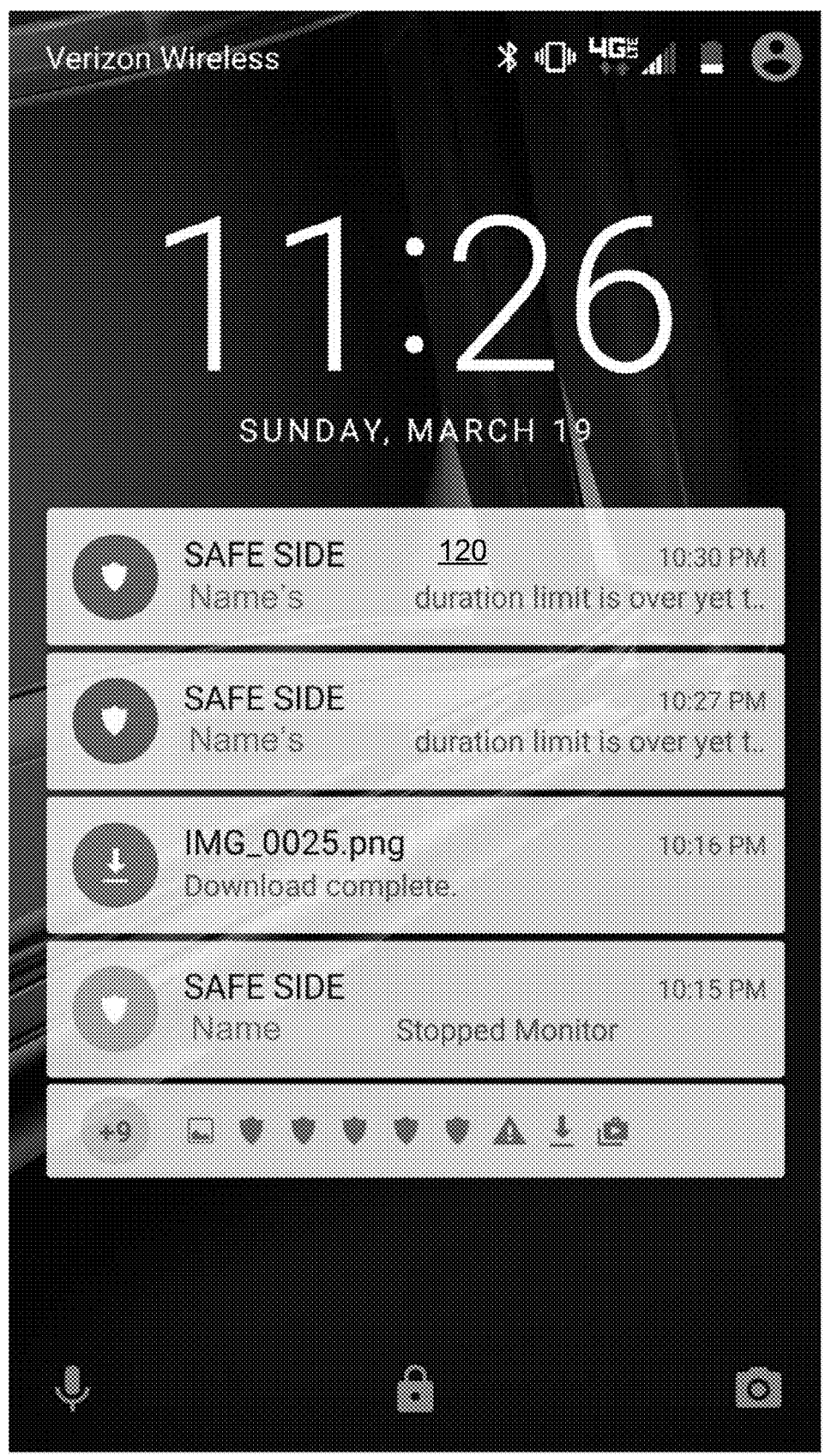
FIG. 18 shows a home page for a monitoring contact.
Figure 19:
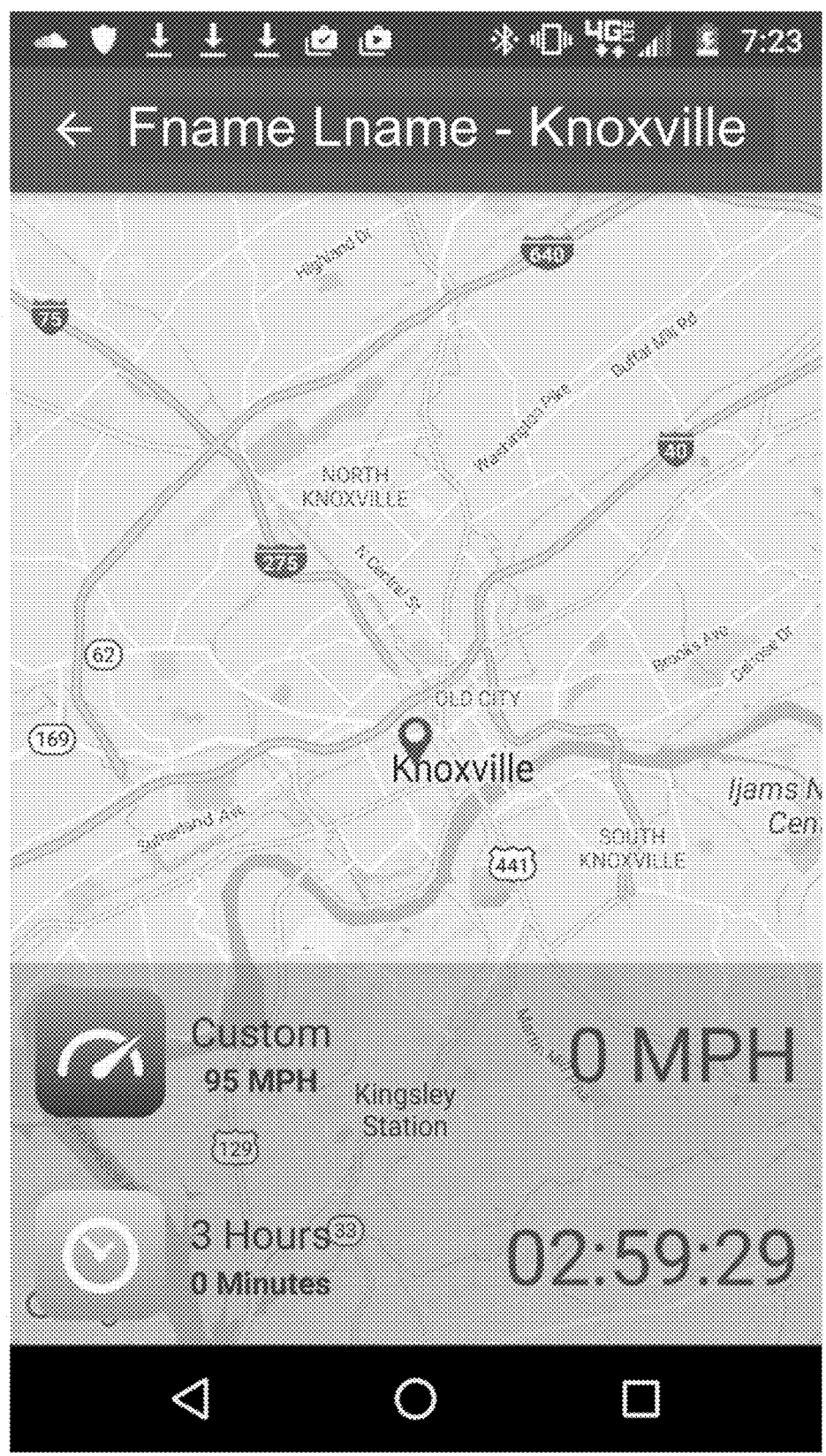
FIGS. 19-22 show views of speed monitoring screens.

Once a monitoring event has been initiated, an emergency contact can select the event to monitor, and view a screen similar to that shown in FIG. 6. If no events for which the contact has been added as a monitoring contact are available, the contact sees the screen on FIG. 7. In several embodiments, an emergency contact can monitor multiple events (and multiple users), with status summary bars or reports 120 on their wireless phone, tablet or computing device, including as alerts on their home or default page, as seen in FIG. 18.

During the monitoring event, if certain of the monitored parameters exceed certain values, then the apparatus displays an alert to the user. An example of such a condition is if the speed of the user is determined to be 30 or 40 mph, and thus greater than typical walking speed, which indicates that the user being monitored is now riding in a car or vehicle. Another alert condition would be if the duration of the monitoring event has exceeded the expected duration by 5 minutes, 10 minutes, or some other established limit, indicating that the user being monitored has been delayed or has been prevented from reaching the destination for some reason. And yet another exemplary alert condition would be if the location of the user device is not at or near the target destination, or within a reasonable distance of the expected pathway or route from the origination location to the destination location. The alert can be specific to the alert condition.

Figure 8:
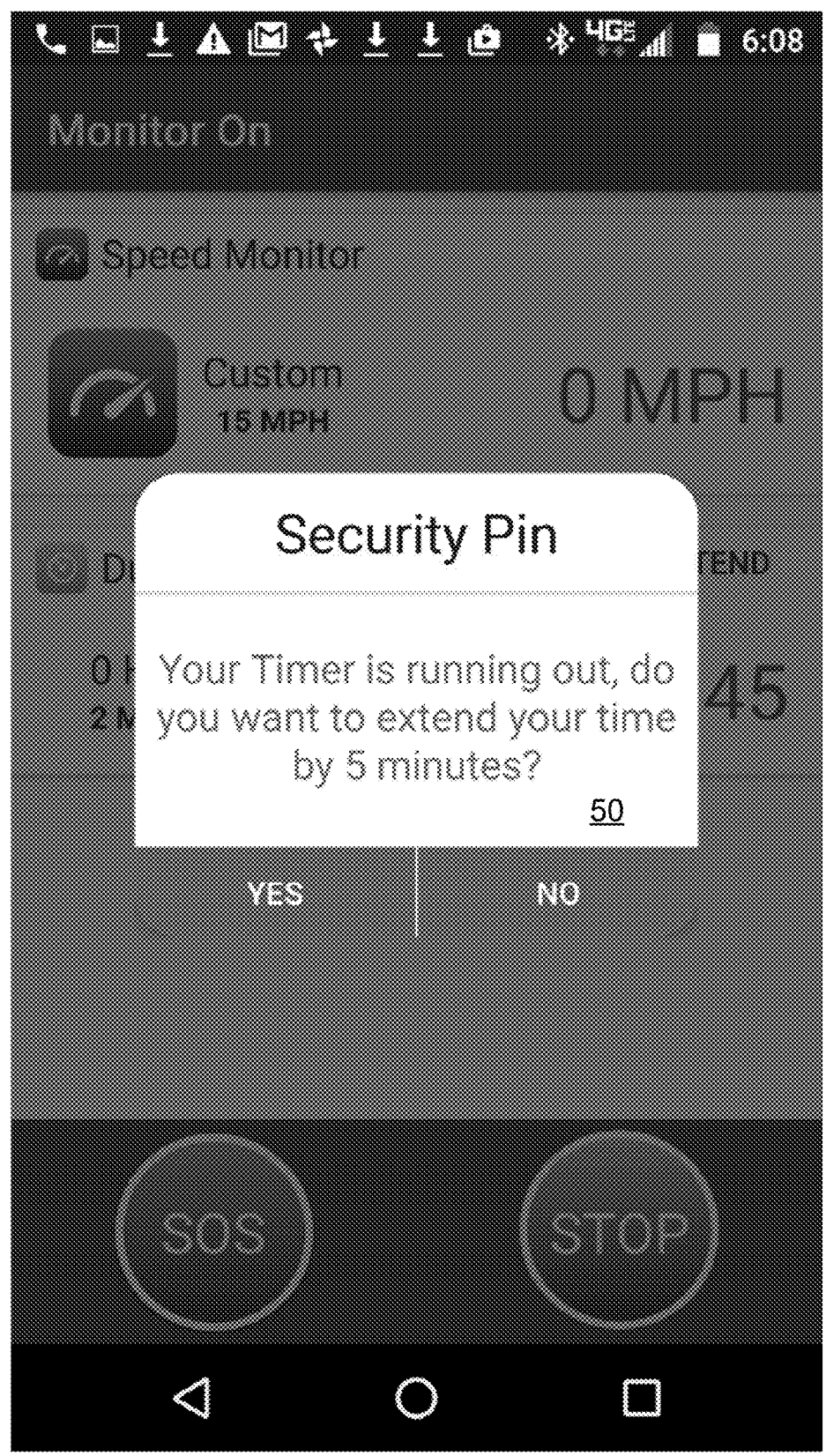
FIGS. 8-9 show views of alert deactivation.
Figure 9:
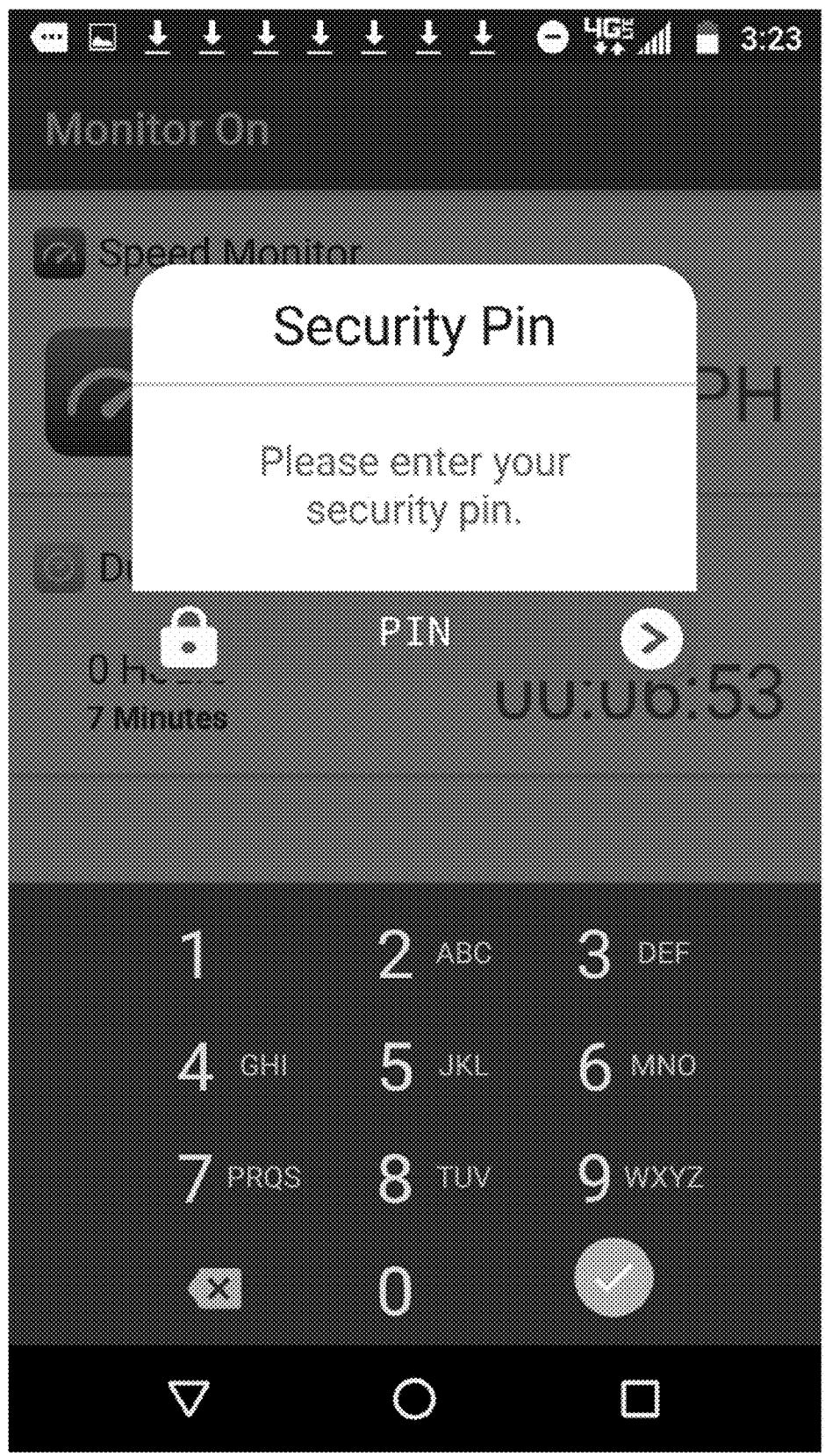
Figure 17:
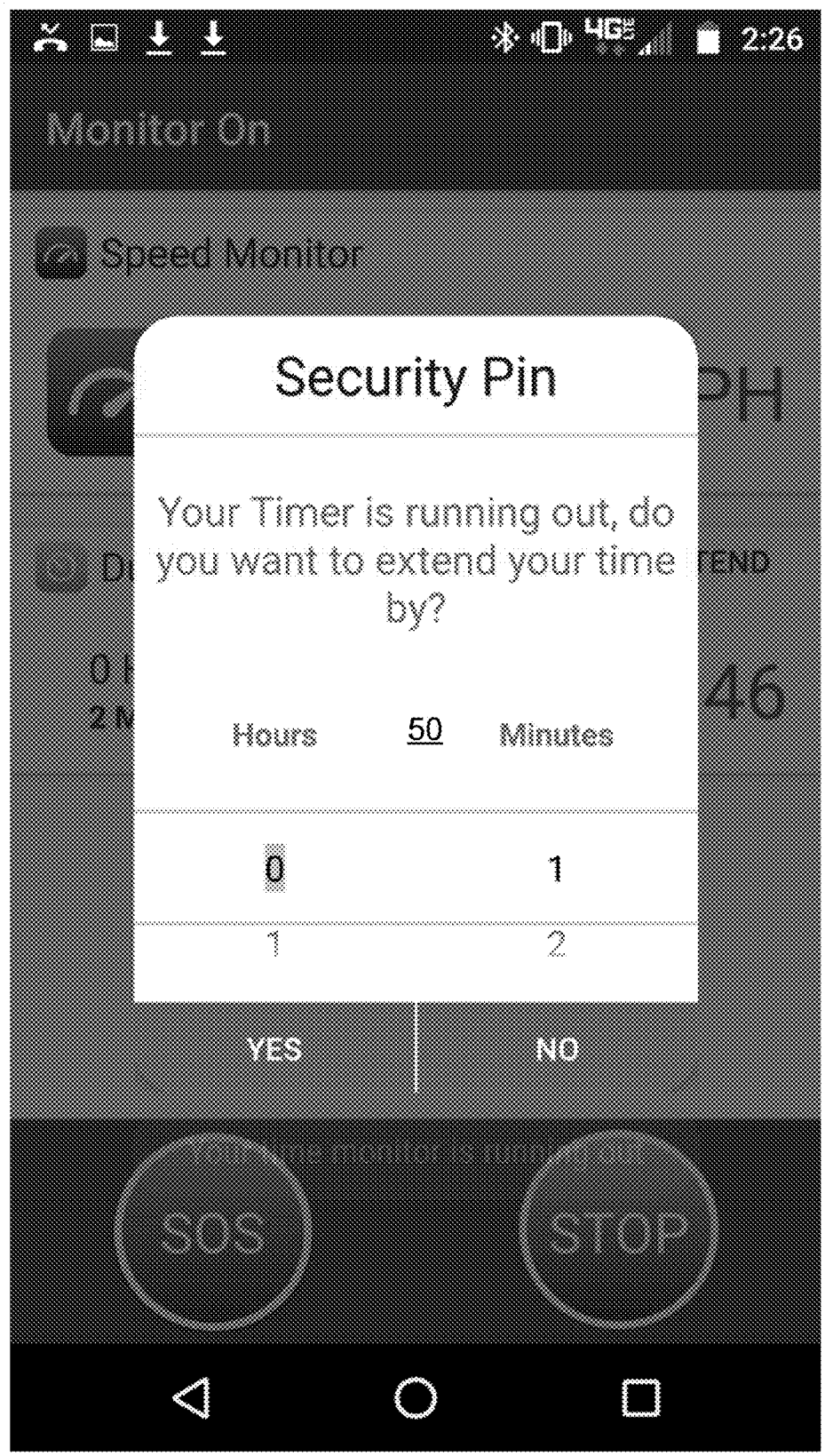
FIG. 17 shows another view of alert deactivation.

In several embodiments, after displaying of the alert to the user, the user then has a limited amount of time to deactivate the alert by entering a password, security PIN or code 50, as seen in FIGS. 8, 9 and 17. Failure to enter the password or code causes the device to send an alert or notification to the registered contacts.

In several embodiments, the user can enter an alternative password or code to cause the apparatus alert to appear to be deactivated, but immediately causes an alert to be sent to the listed contacts, and, in some cases, an automatic call to the police or 911 emergency service. This allows the user to send a request for immediate help without alerting others in the immediate vicinity (such as, for example, a kidnapper). Similarly, for some or all alert conditions, an call or contact with an emergency contact, police, or 911 emergency service may be immediately made, without providing the user the opportunity to deactivate the alert.

Figure 20:
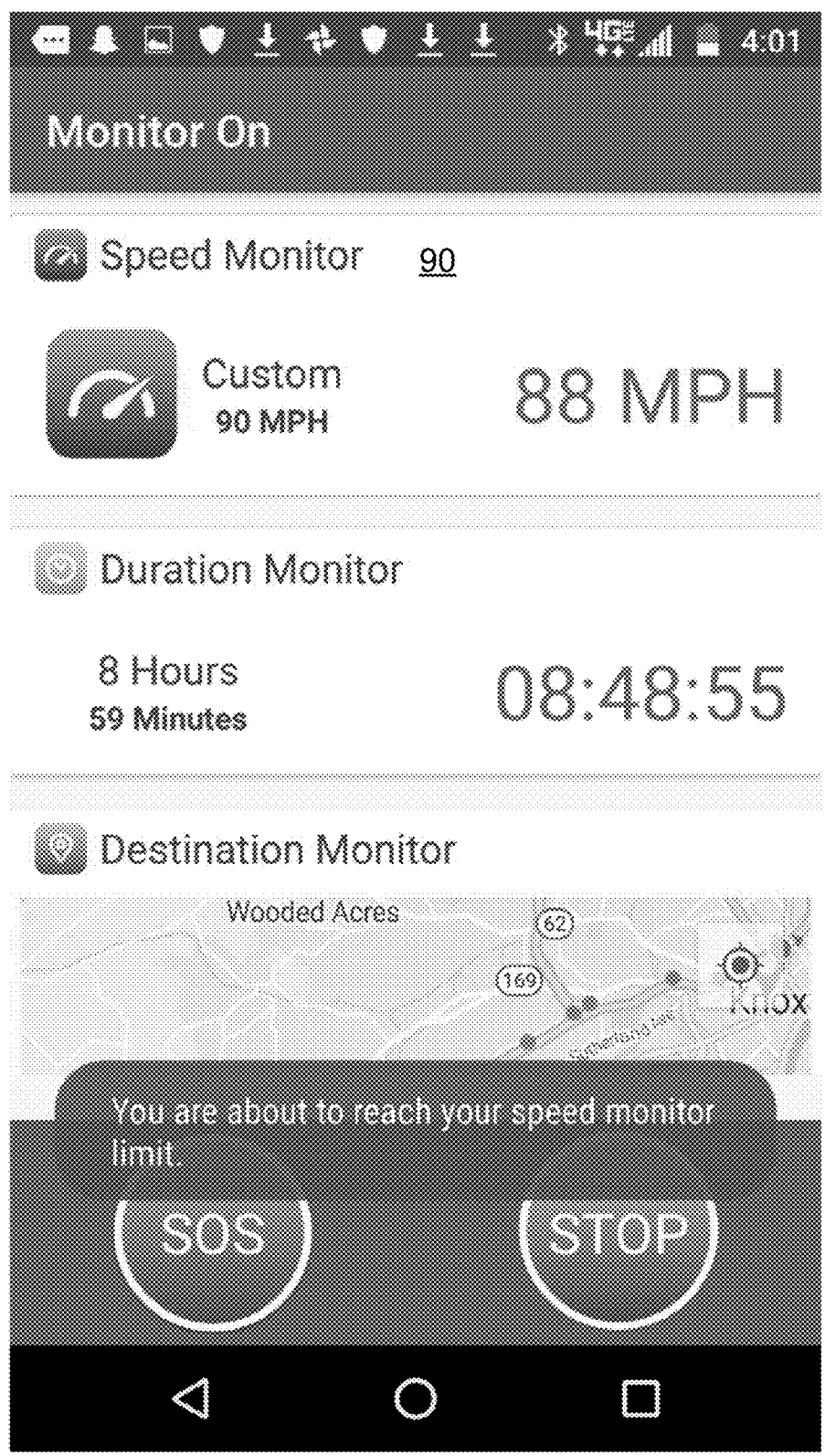
Figure 21:
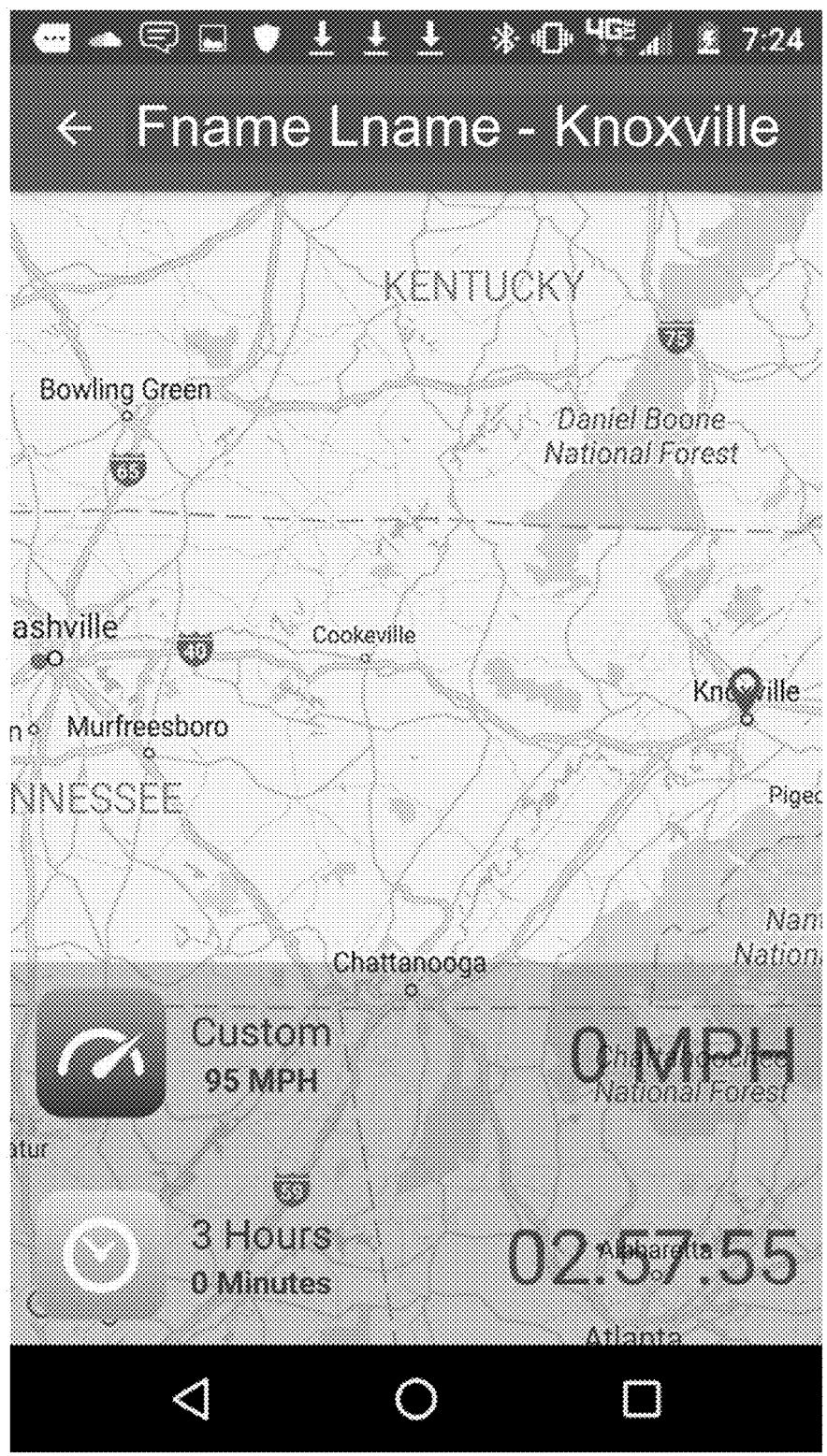
Figure 22:
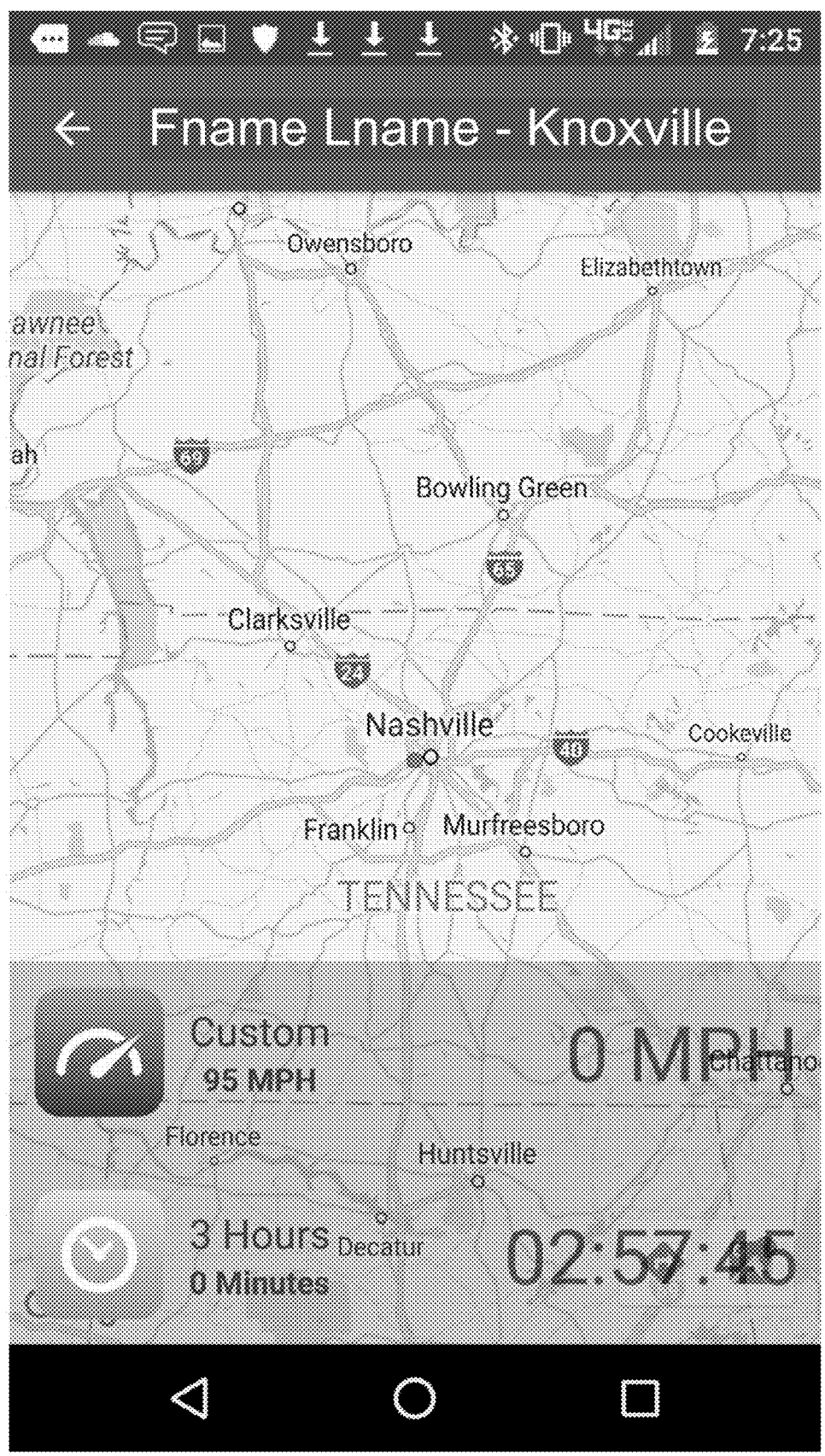

The system also is able to determine if the user is going too fast for a particular monitoring event, as seen in FIGS. 19-22. FIG. 20 shows an example of a speed monitor warning screen 90. The user also can choose to stop a particular monitoring event when underway by pressing the STOP or similar icon 110. When approaching a pre-established speed monitor limit (in this case, 90 mph), the system alerts the user to the fact that their speed is high and potentially dangerous to the user's safety. If the limit is reached, another alert is provided to the user, and the system also may provide notice to the user's contacts. In several embodiments, the system dynamically determines a speed monitor limit based on the GPS location data and the posted speed limit for that location. The speed monitor limit may then be the posted speed limit, or the posted speed limit plus a set amount (e.g., a fixed +5 or +10 mph; +5 to 10% of the posted speed limit, and the like).

Figure 10:
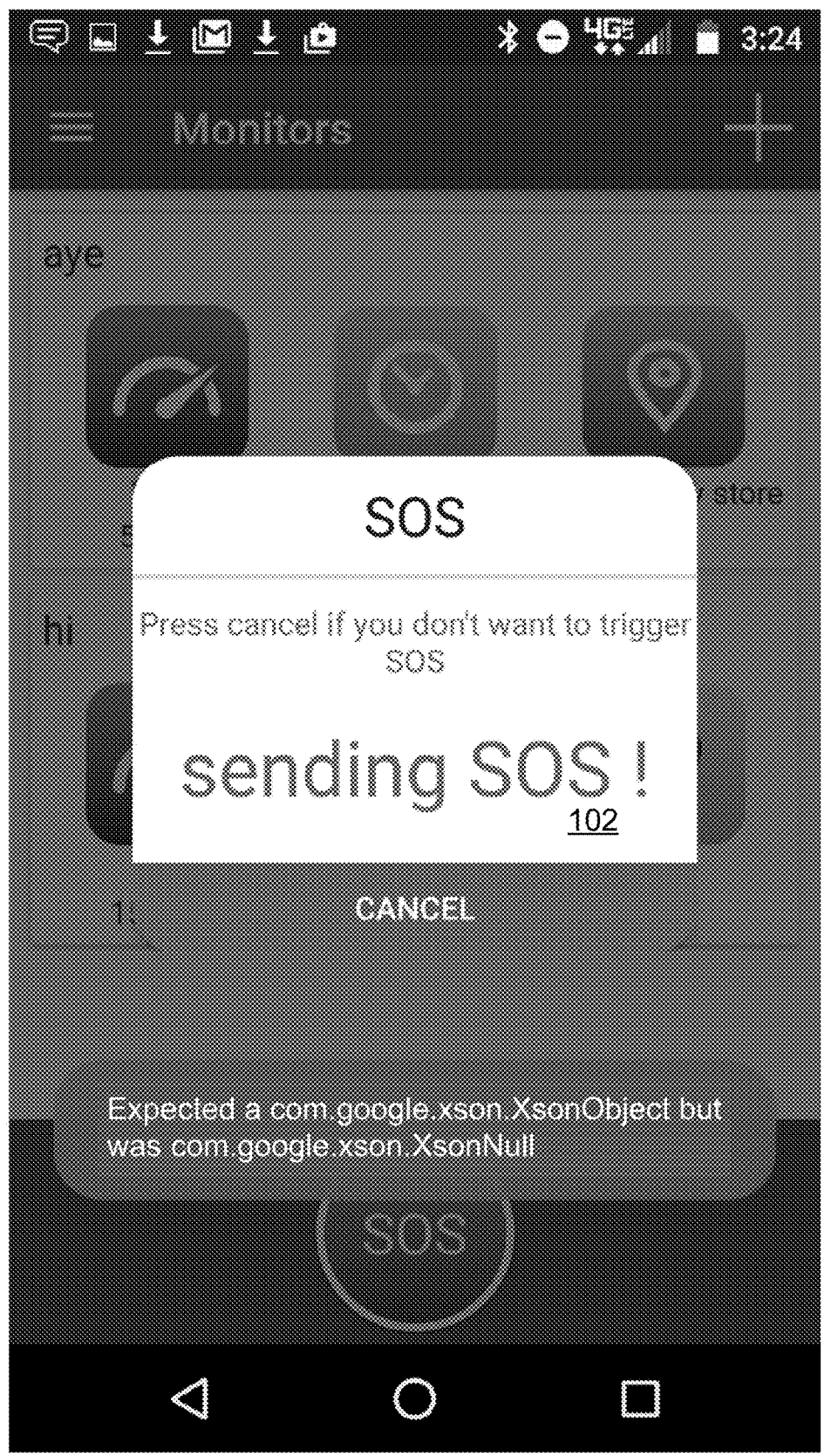
FIG. 10 shows a view of an SOS alert screen.
Figure 11:
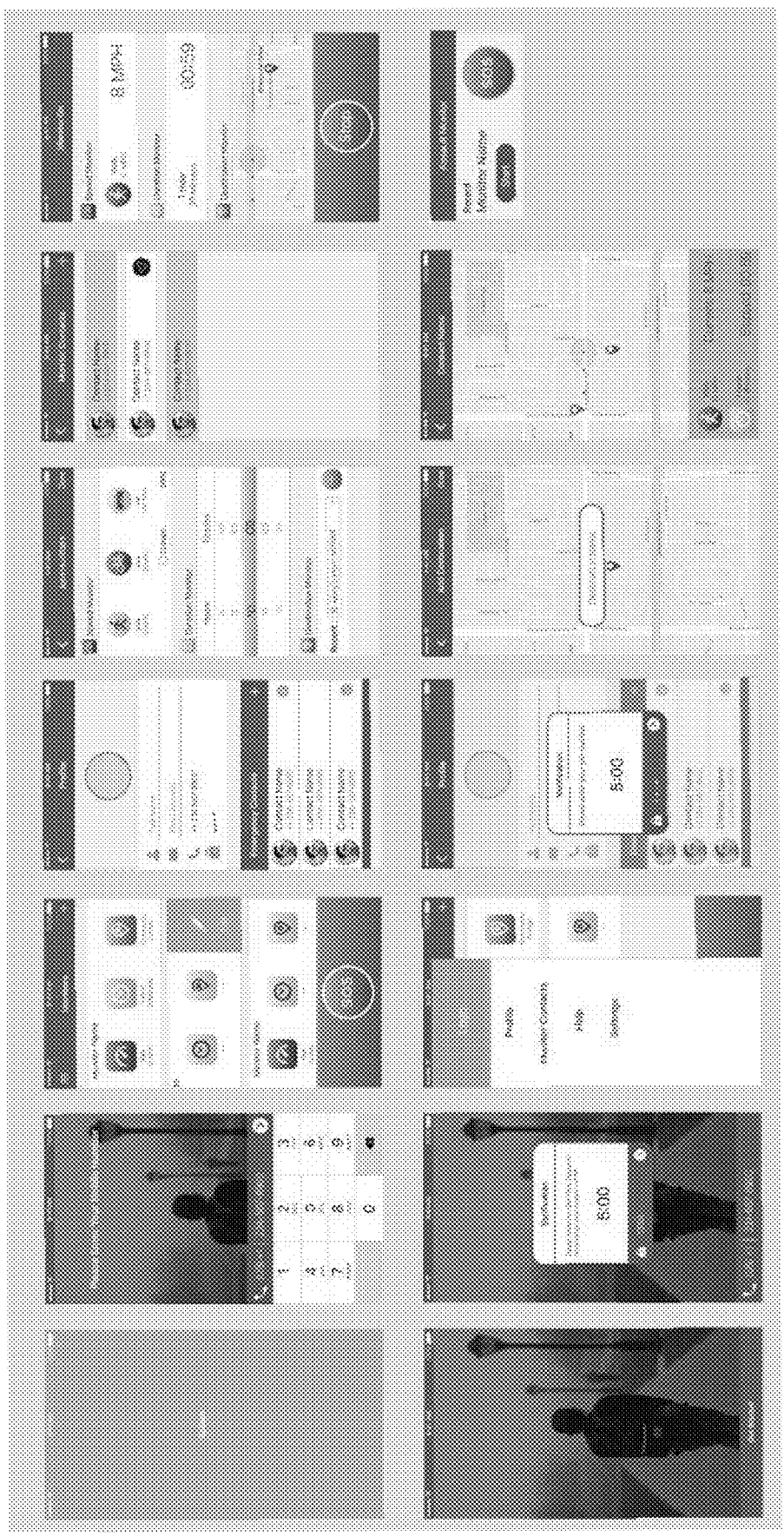
FIG. 11 shows examples of interface screens for the monitoring system.
Figure 12:
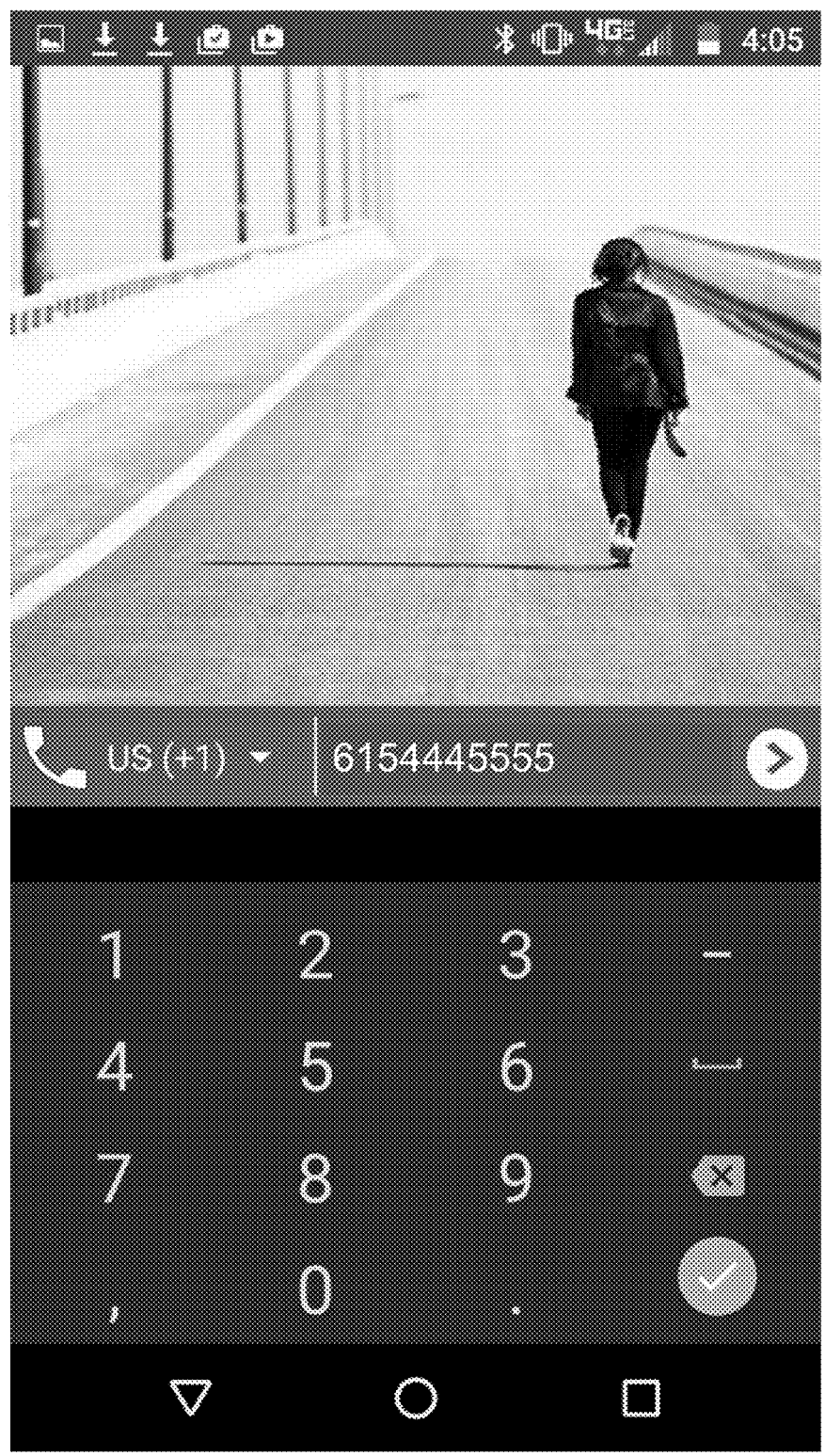
FIGS. 12-15 show examples of user set-up screens.
Figure 13:
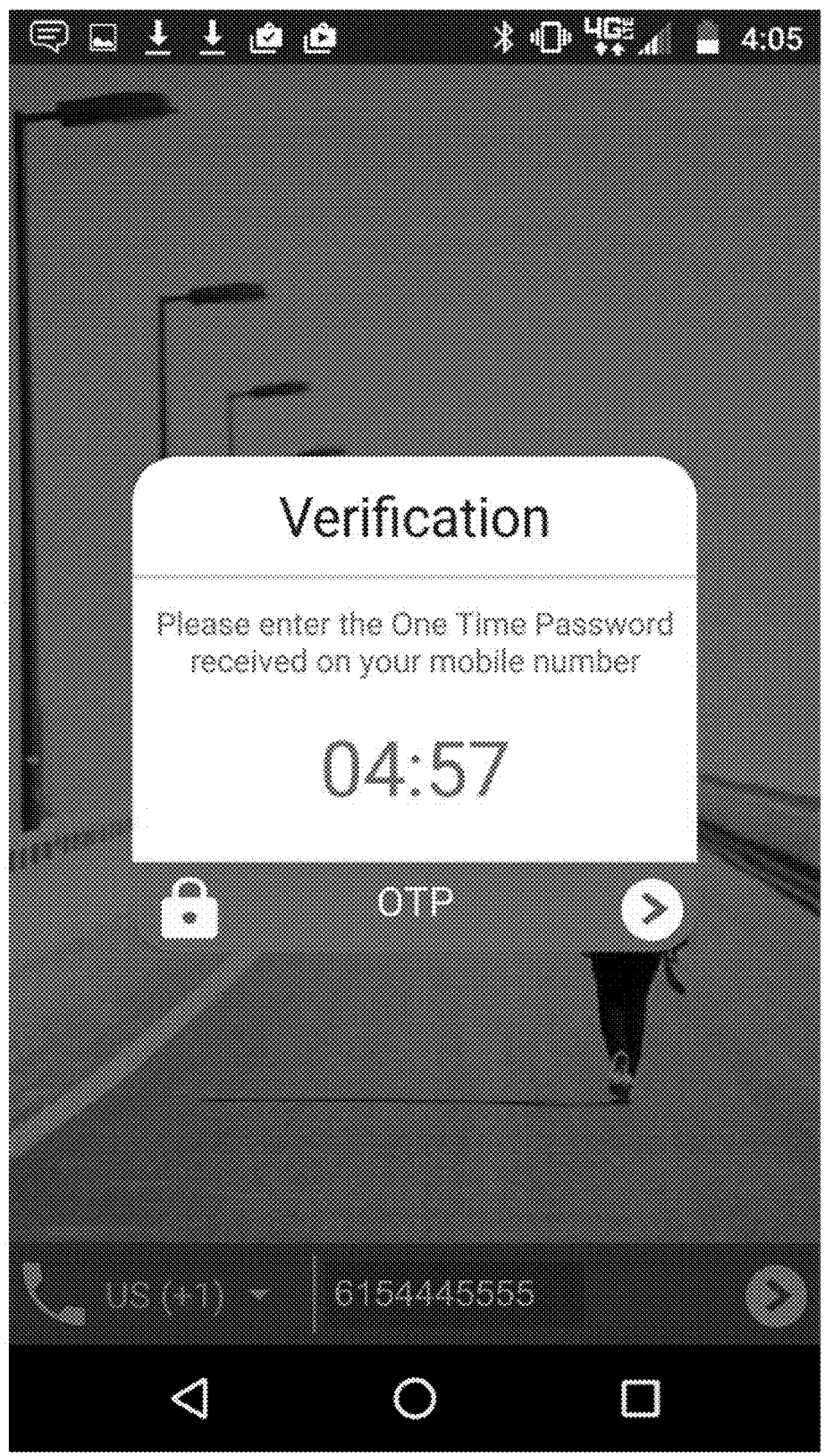
Figure 14:
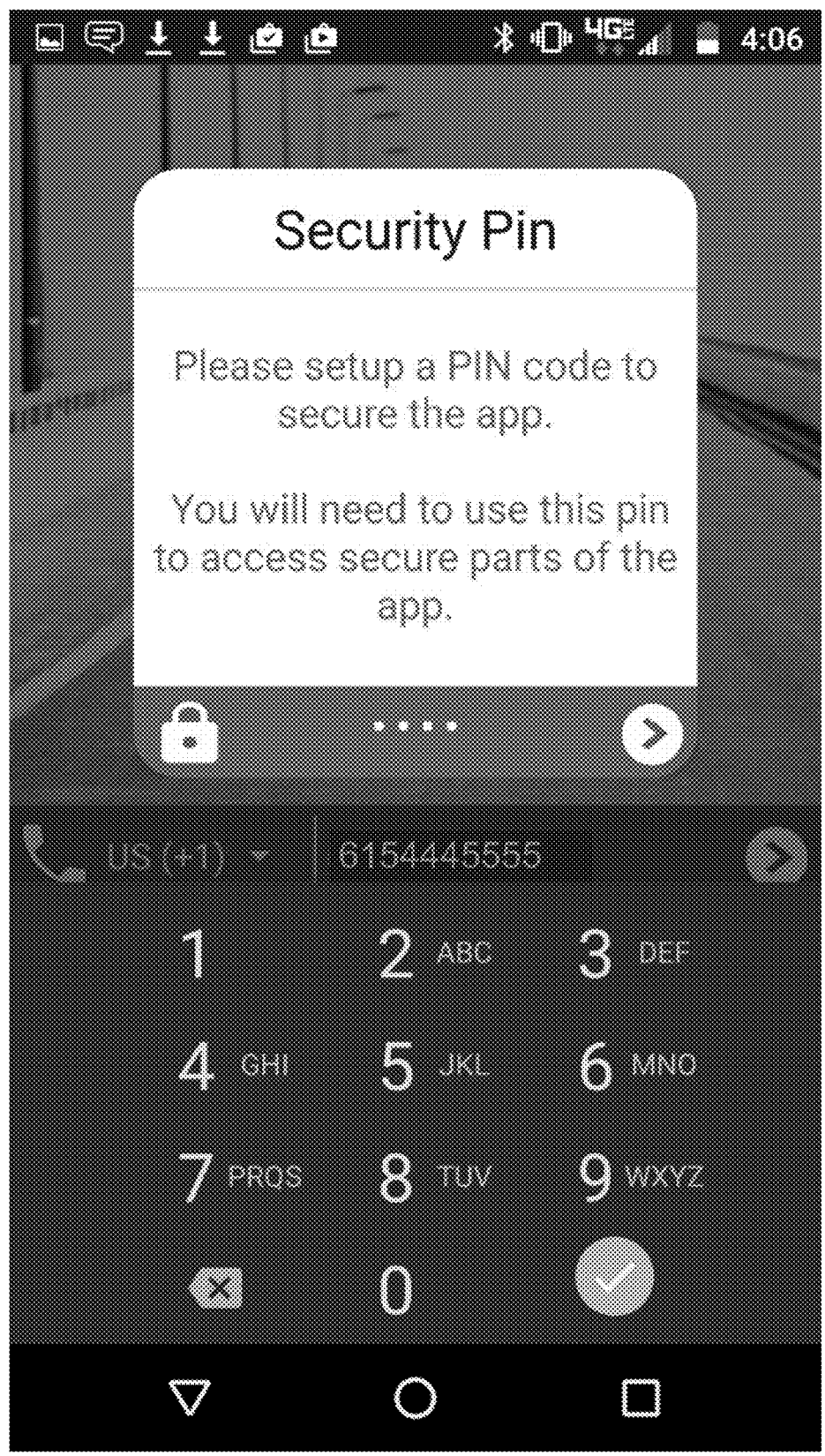
Figure 15:
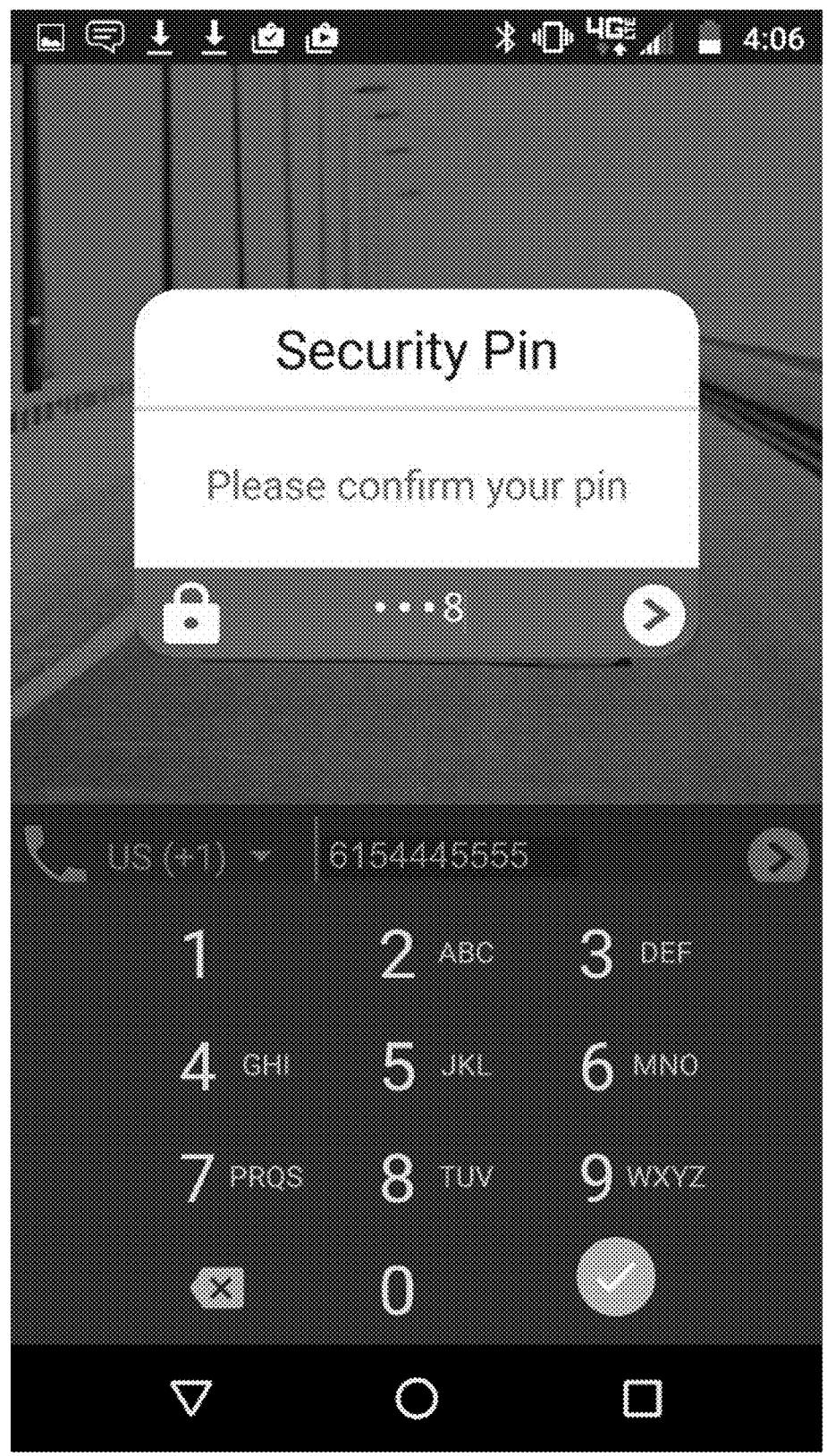

In additional embodiments, the device includes an "SOS" or emergency alert button 100. Pressing the SOS or emergency alert button causes an alert to be sent immediately to the listed contacts. In some cases, an automatic call to the police or 911 emergency service may also be sent. Alternatively, the user may be prompted to confirm sending 102 of the SOS alert, as seen in FIG. 10. In several embodiments, certain types of situations can result in alerts being dispatched to all listed contacts and/or the police or 911 emergency service. User privacy is otherwise maintained outside the alerts.

The user also can choose to stop a particular monitoring event when underway by pressing the STOP or similar icon 110.

In several embodiments, the system provides for scheduling and carrying out one or more "safety calls." The user submits a request to the remote service to perform a call to the user's mobile phone at a particular time or within a particular window (multiple calls can be scheduled). The system then makes a call at the scheduled time to the user's device with a reasonable, area-code specific callback number displayed on the screen. If the call is not answered, an alert is sent immediately to the listed contacts. In some cases, an automatic call to the police or 911 emergency service may also be sent. If the call is answered but the user is under duress, the user may provide a seemingly normal or innocuous response but with a particular code word or phrase (or without a particular code word or phrase), which in turn triggers an alert as described above.

In several embodiments, the apparatus comprises a case or shell with a display screen, which may be a touchscreen. The case or shell contains a GPS tracking device, a clock and/or timer, a wireless communication transmitter (which may be cellular), and at least one microprocessor. The apparatus may be contained in a carrying case sized to fit in a pocket, clipped to a belt, strapped to a wrist or arm, or carried in a similar manner. The microprocessor or chip may be programmed to provide the user interface, control monitoring functions, and manage other operations as described above In several embodiments, the apparatus may be a smart phone, tablet, or similar mobile computing device with wireless communications, and the monitoring operations controlled by an application running thereon.

In order to provide a context for the various computer-implemented aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), tablets, smart phones, touch screen devices, smart TV, internet enabled appliances, internet enabled security systems, internet enabled gaming systems, internet enabled watches; internet enabled cars (or transportation), network PCs, minicomputers, mainframe computers, embedded systems, virtual systems, distributed computing environments, streaming environments, volatile environments, and the like.

Embodiments of the invention may be implemented in the form of computer-executable instructions, such as program code or program modules, being executed by a computer, virtual computer, or computing device. Program code or modules may include programs, objects, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices such as, but not limited to, hard drives, solid state drives (SSD), flash drives, USB drives, optical drives, and internet-based storage (e.g., "cloud" storage).

In one embodiment, a computer system comprises multiple client devices in communication with one or more server devices through or over a network, although in some cases no server device is used. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C #, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

The invention claimed is:

1. A monitoring apparatus, comprising:
   a user interface coupled to a display, and further comprising at least one data entry mechanism;
   a GPS tracking device;
   a timer;
   a wireless communication transmitter;
   at least one microprocessor in electronic communication with the GPS tracking device and the timer and the wireless communication transmitter, wherein the microprocessor is configured to monitor a plurality of monitoring parameters to determine whether a threshold value of at least one monitoring parameter from the plurality of monitoring parameters is exceeded during a monitoring event or period for a user, wherein said plurality of monitoring parameters comprises a speed of the user, a travel time of the user, and an absence of the user from an expected location, and upon determining that said threshold value has been exceeded, and prior to sending any contact message to any previously established contact, to prompt the user to engage a deactivation means using the user interface within a certain time threshold;
   wherein the microprocessor is further configured, upon the user not engaging said deactivation means within said certain time threshold, to automatically engage the wireless communication transmitters to contact at least one previously established contact upon exceeding the threshold value for the at least one monitoring parameter.

2. The apparatus of claim 1, wherein the deactivation means comprises a deactivation code, a deactivation word, a biometric identifier configured to identify the user, or a combination thereof.

3. The apparatus of claim 1, further wherein the microprocessor is configured with an emergency alert function to notify said at least one previously established contact upon activation by the user.

4. The apparatus of claim 1, wherein the wireless communication transmitters sends a phone call, an email, and/or a text message to said at least one previously established contact.

5. The apparatus of claim 1, wherein the data entry mechanism comprises the display as a touchscreen display.

6. The apparatus of claim 1, wherein the data entry mechanism comprises a keyboard or buttons on the case, or a microphone in the case.

7. The apparatus of claim 1, wherein the at least one monitoring parameter comprises speed, time, and/or location.

8. The apparatus of claim 1, wherein the at least one monitoring parameter comprises a speed of the monitoring apparatus as determined by changes in location of the apparatus over a period of time.

9. The apparatus of claim 1, wherein the at least one monitoring parameter comprises a period of time.

10. The apparatus of claim 1, wherein the at least one monitoring parameter comprises a specific time.

11. The apparatus of claim 1, wherein the at least one monitoring parameter comprises a specific location.

12. The apparatus of claim 1, wherein the at least one monitoring parameter comprises a location outside a specified boundary or geo-fenced area.

13. The apparatus of claim 1, further wherein the threshold value comprises a maximum speed, a maximum period of time to arrive at a specified location, a maximum distance from the specified location; a maximum distance from a specific route to the specified location, or a combination thereof.

14. The apparatus of claim 1, wherein the system is further configured to notify the at least one previously established contact of the user's location, the user's contact information, the threshold value that triggered the means for contacting at least one emergency contact, or a combination thereof.

15. The apparatus of claim 1, further comprising:
   a safety contact feature and a remote service, wherein the safety contact feature is configured to convey a request from the user to the remote service; the request comprising an instruction for the remote service to perform at least one contact attempt to the user's monitoring apparatus during a particular time or within a particular time window; and
   the safety contact feature being further configured to notify the at least one emergency contact if the user fails to answer or otherwise respond to the at least one contact attempt.

16. The system of claim 15, wherein the safety contact feature further comprises an emergency response by the user, wherein the emergency response appears innocuous, but is configured to trigger an alert to the at least one previously established contact.

\* \* \* \* \*